(12) United States Patent
Mandic et al.

(10) Patent No.: US 8,823,750 B2
(45) Date of Patent: Sep. 2, 2014

(54) INPUT POINTER DELAY AND ZOOM LOGIC

(75) Inventors: Mirko Mandic, Seattle, WA (US);
Michael J. Ens, Redmond, WA (US);
Justin E. Rogers, Redmond, WA (US);
Matthew A. Rakow, Seattle, WA (US);
Jacob S. Rossi, Seattle, WA (US); Jane T. Kim, Seattle, WA (US); Sandra G. Roberts, Bothell, WA (US); Siddhartha Prakash, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/363,127

(22) Filed: Jan. 31, 2012

(65) Prior Publication Data

US 2013/0176344 A1 Jul. 11, 2013

(30) Foreign Application Priority Data

Jan. 6, 2012 (CA) .................................. 2763276

(51) Int. Cl.
*G09G 5/00* (2006.01)
(52) U.S. Cl.
USPC ......................................................... 345/660
(58) Field of Classification Search
USPC .................................. 715/800; 345/661, 660
See application file for complete search history.

(56) References Cited

U.S. PATENT DOCUMENTS

| 5,956,035 | A | 9/1999 | Sciammarella et al. | |
|---|---|---|---|---|
| 6,476,829 | B1 | 11/2002 | Smith et al. | |
| 6,567,102 | B2 | 5/2003 | Kung | |
| 7,721,192 | B2 | 5/2010 | Milic-Frayling et al. | |
| 7,817,168 | B2 | 10/2010 | Nagiyama et al. | |
| 8,009,179 | B2 * | 8/2011 | Araki | 345/660 |
| 2002/0015064 | A1 | 2/2002 | Robotham et al. | |
| 2008/0260248 | A1 * | 10/2008 | Kondo et al. | 382/173 |
| 2010/0060666 | A1 | 3/2010 | Fong | |
| 2010/0115398 | A1 | 5/2010 | Yi | |
| 2010/0302281 | A1 * | 12/2010 | Kim | 345/661 |
| 2011/0035702 | A1 * | 2/2011 | Williams et al. | 715/800 |
| 2011/0093822 | A1 | 4/2011 | Sherwani | |
| 2011/0095993 | A1 | 4/2011 | Zuverink | |
| 2011/0231782 | A1 | 9/2011 | Rohrabaugh et al. | |
| 2011/0313649 | A1 * | 12/2011 | Bales et al. | 701/200 |

FOREIGN PATENT DOCUMENTS

| CA | 2763276 | 3/2013 |
|---|---|---|
| CA | 2551624 | 6/2013 |
| KR | 10-2011-0127752 A | 11/2011 |

OTHER PUBLICATIONS

Cai, Jim, "Page Layout Adaptation for Small Form Factor Devices", Retrieved at <<http://www.cs.utoronto.ca/~jcai/2514/term.pdf>>, Retrieved Date: Nov. 23, 2011, pp. 1-12.

(Continued)

*Primary Examiner* — Phi Hoang
(74) *Attorney, Agent, or Firm* — Andrew Sanders; Micky Minhas; Wolfe-SBMC (57) ABSTRACT

Various embodiments enable repetitive gestures, such as multiple serial gestures, to be implemented efficiently so as to enhance the user experience. Other embodiments provide various approaches to zoom operations that consider a particular element's contextual surroundings in making a zoom decision that is designed to enhance the user experience and provide efficiently-zoomed content given a device's or rendering container's form factor.

19 Claims, 9 Drawing Sheets

(56) References Cited

OTHER PUBLICATIONS

Murugesan, et al., "Addressing the Challenges of Web Applications on Mobile Handheld Devices", Retrieved at <<http://ieeexplore.ieee.org/stamp/stamp.jsp?tp=&arnumber=1493609>>, Proceedings of the International Conference on Mobile Business, Aug. 15, 2005, pp. 199-205.

"Foreign Office Action", Canadian Application No. 2763276, (May 7, 2012), 3 pages.

"Foreign Office Action", Canadian Application No. 2763276, (Jun. 26, 2012), 3 pages.

"Foreign Notice of Allowance", Canadian Application No. 2763276, (Oct. 19, 2012), 1 page.

"Foreign Office Action", Canadian Application No. 2798507, (Mar. 7, 2013), 3 pages.

"Foreign Office Action", Canadian Application No. 2,798,507, (Jun. 26, 2013), 3 Pages.

"International Search Report", Mail Date: May 10, 2013, Application No. PCT/US2013/020417, Filed date: Jan. 5, 2013, pp. 9.

"Foreign Office Action", CA Application No. 2,798,507, Oct. 18, 2013, 3 Pages.

"Foreign Office Action", CA Application No. 2,798,507, Feb. 18, 2014, 4 Pages.

* cited by examiner

INPUT POINTER DELAY AND ZOOM LOGIC

PRIORITY CLAIM

This application claims priority under 35 U.S.C. §119 to Canadian Patent Application Serial No. 2,763,276 filed in Canada on Jan. 6, 2012 and titled "Input Pointer Delay and Zoom Logic," the disclosure of which is incorporated by reference in its entirety herein.

BACKGROUND

When a user provides input to a computing device to zoom in on a particular element, it can be assumed that the user is interested in that particular element. Challenges continue to face those who develop zoom-based technology to provide a desirable user experience.

SUMMARY

This Summary is provided to introduce a selection of concepts in a simplified form that are further described below in the Detailed Description. This Summary is not intended to identify key features or essential features of the claimed subject matter.

Various embodiments enable repetitive gestures, such as multiple serial gestures, to be implemented efficiently so as to enhance the user experience.

In at least some embodiments, a first gesture associated with an object is detected. The first gesture is associated with a first action. Responsive to detecting the first gesture, pre-processing associated with the first action is performed in the background. Responsive to detecting a second gesture associated with the object within a pre-defined time period, an action associated with the second gesture is performed. Responsive to the second gesture not being performed within the pre-defined time period, processing associated with the first action is completed.

In at least some other embodiments, a first tap associated with an object is detected and a timer is started. Responsive to detecting the first tap, a style that has been defined for an element of which the object is a type is applied. Responsive to detecting a second tap within a time period defined by the timer, an action associated with a gesture comprising the first and second taps is performed. Responsive to not detecting a second tap within the time period defined by the timer, an action associated with the first tap is performed.

In yet other embodiments, various approaches to zoom operations consider a particular element's contextual surroundings in making a zoom decision that is designed to enhance the user experience and provide efficiently-zoomed content given a device's or rendering container's form factor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable repetitive gestures, such as multiple serial gestures, to be implemented efficiently so as to enhance the user experience.

In at least some embodiments, a first gesture associated with an object is detected. The first gesture is associated with a first action. Responsive to detecting the first gesture, pre-processing associated with the first action is performed in the background. Responsive to detecting a second gesture associated with the object within a pre-defined time period, an action associated with the second gesture is performed. Responsive to the second gesture not being performed within the pre-defined time period, processing associated with the first action is completed.

In at least some other embodiments, a first tap associated with an object is detected and a timer is started. Responsive to detecting the first tap, a style that has been defined for an element of which the object is a type is applied. Responsive to detecting a second tap within a time period defined by the timer, an action associated with a gesture comprising the first and second taps is performed. Responsive to not detecting a second tap within the time period defined by the timer, an action associated with the first tap is performed.

In yet other embodiments, various approaches to zoom operations consider a particular element's contextual surroundings in making a zoom decision that is designed to enhance the user experience and provide efficiently-zoomed content given a device's or rendering container's form factor.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

Figure 1:
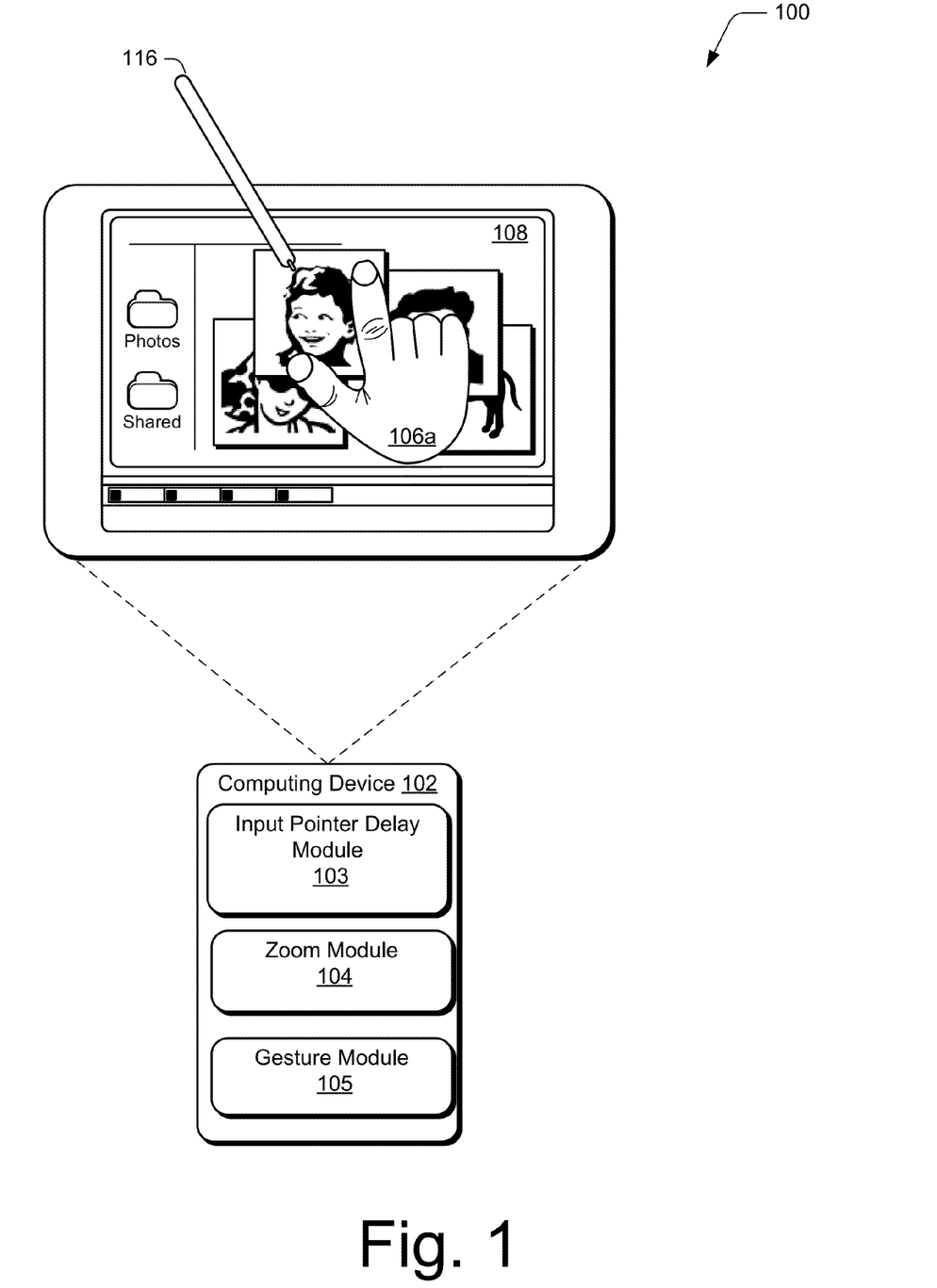
FIG. 1 is an illustration of an environment in an example implementation in accordance with one or more embodiments.

FIG. 1 is an illustration of an environment 100 in an example implementation that is operable to employ the input pointer delay techniques and zoom logic described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes an input pointer delay module 103 configured to enable repetitive gestures, such as multiple serial gestures, to be implemented efficiently so as to enhance the user experience. The input pointer delay module 103 can make use of a timer to measure the time between multiple serial gestural inputs. Given the type and timing of the gestural inputs, actions associated with a first of the gestures and/or one or more of subsequent gestures or combinations thereof can be performed.

Computing device 102 also includes a zoom module 104 that is configured to perform operations as described above and below. The zoom module is configured to perform zoom operations that consider and take into account a particular object or element's contextual surroundings in making a zoom decision that is designed to enhance the user experience and provide efficiently-zoomed content given a device's or rendering container's form factor.

Computing device 102 also includes a gesture module 105 that recognizes input pointer gestures that can be performed by one or more fingers, and causes operations or actions to be performed that correspond to the gestures. The gestures may be recognized by module 105 in a variety of different ways. For example, the gesture module 105 may be configured to recognize a touch input, such as a finger of a user's hand 106a as proximal to display device 108 of the computing device 102 using touchscreen functionality. Module 105 can be utilized to recognize single-finger gestures and bezel gestures, multiple-finger/same-hand gestures and bezel gestures, and/or multiple-finger/different-hand gestures and bezel gestures. Although the input pointer delay module 103, zoom module 104, and gesture module 105 are depicted as separate modules, the functionality provided by each can be implemented in a single, integrated gesture module. The functionality provided by modules 103, 104 and/or 105 can be implemented by any suitably configured application including, by way of example and not limitation, a web browser.

The computing device 102 may also be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106a versus an amount of the display device 108 that is contacted by the stylus 116.

Thus, the gesture module 105 may support a variety of different gesture techniques through recognition and leverage of a division between stylus and touch inputs, as well as different types of touch inputs.

Figure 2:
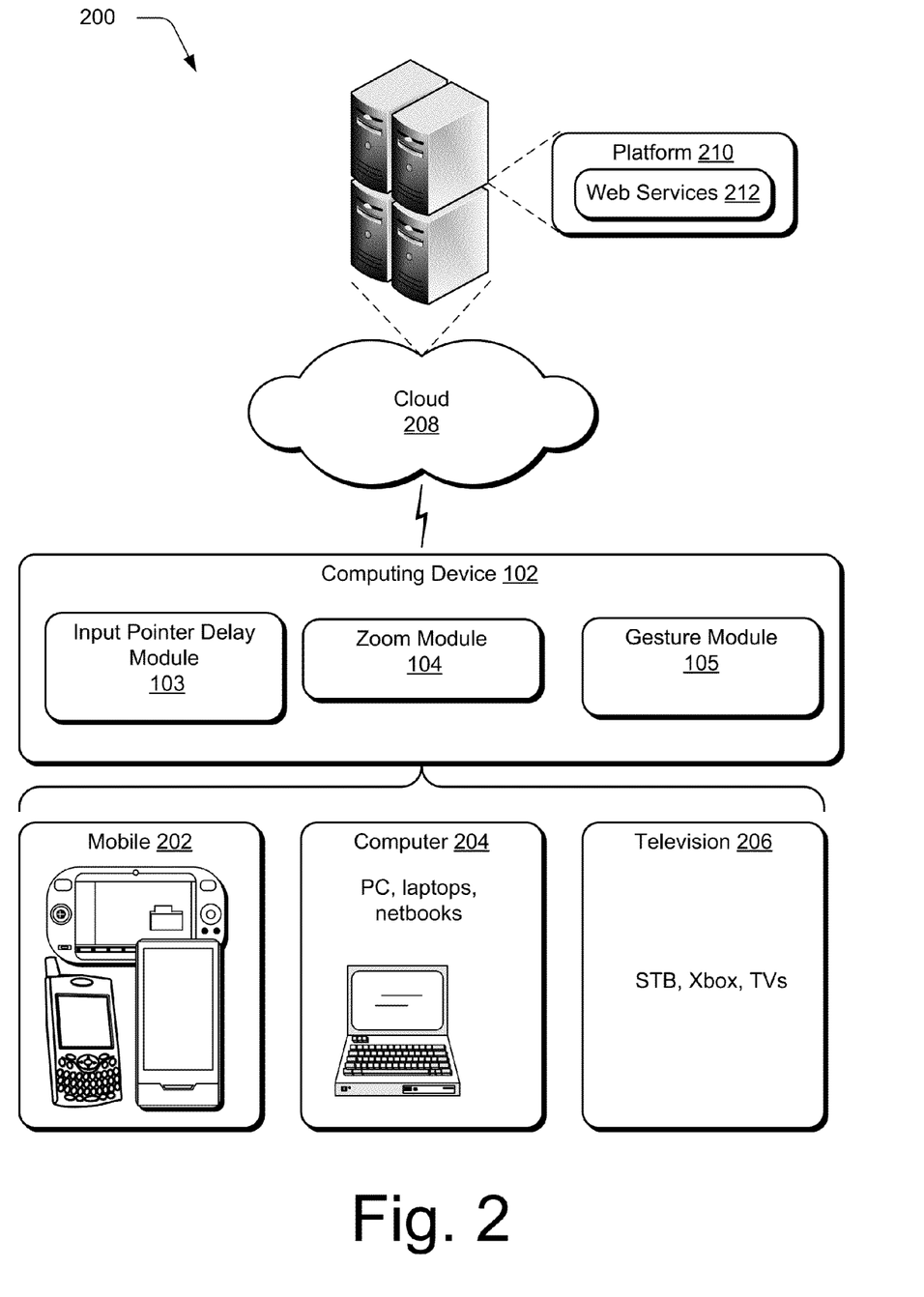
FIG. 2 is an illustration of a system in an example implementation showing FIG. 1 in greater detail.

FIG. 2 illustrates an example system 200 showing the input pointer delay module 103, zoom module 104 and gesture module 105 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size or form factor and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the input pointer delay module 103 and gesture module 105 may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe various example embodiments. A section entitled "Example Input Pointer Delay Embodiments" describes embodiments in which an input pointer delay can be employed in accordance with one or more embodiments. Following this, a section entitled "Implementation Example" describes an example implementation in accordance with one or more embodiments. Next, a section entitled "Example Zoom Logic" describes zoom logic in accordance with one or more embodiments. Following this, a section entitled "Zoom Logic—Implementation Example" describes one implementation example in accordance with one or more embodiments. Last, a section entitled "Example Device" describes aspects of an example device that can be utilized to implement one or more embodiments.

Having described example operating environments in which the input pointer delay functionality and zoom logic can be utilized, consider now a discussion of some example embodiments.

Example Input Pointer Delay Embodiments

In the examples about to be described, two different approaches are described which, in at least some embodiments, may be employed together. The first approach utilizes background pre-processing in connection with receiving multiple serial gestures to mitigate the negative impact, as perceived by the user, of an input pointer delay. The second approach, which may or may not be used in connection with the first approach, is designed to provide concurrent user feedback to a user who is interacting with a resource such as a webpage. Each approach is discussed under its own separate sub-heading, followed by a discussion of an approach that combines both the first and second approaches.

Background Pre-Processing—Example

Figure 3:
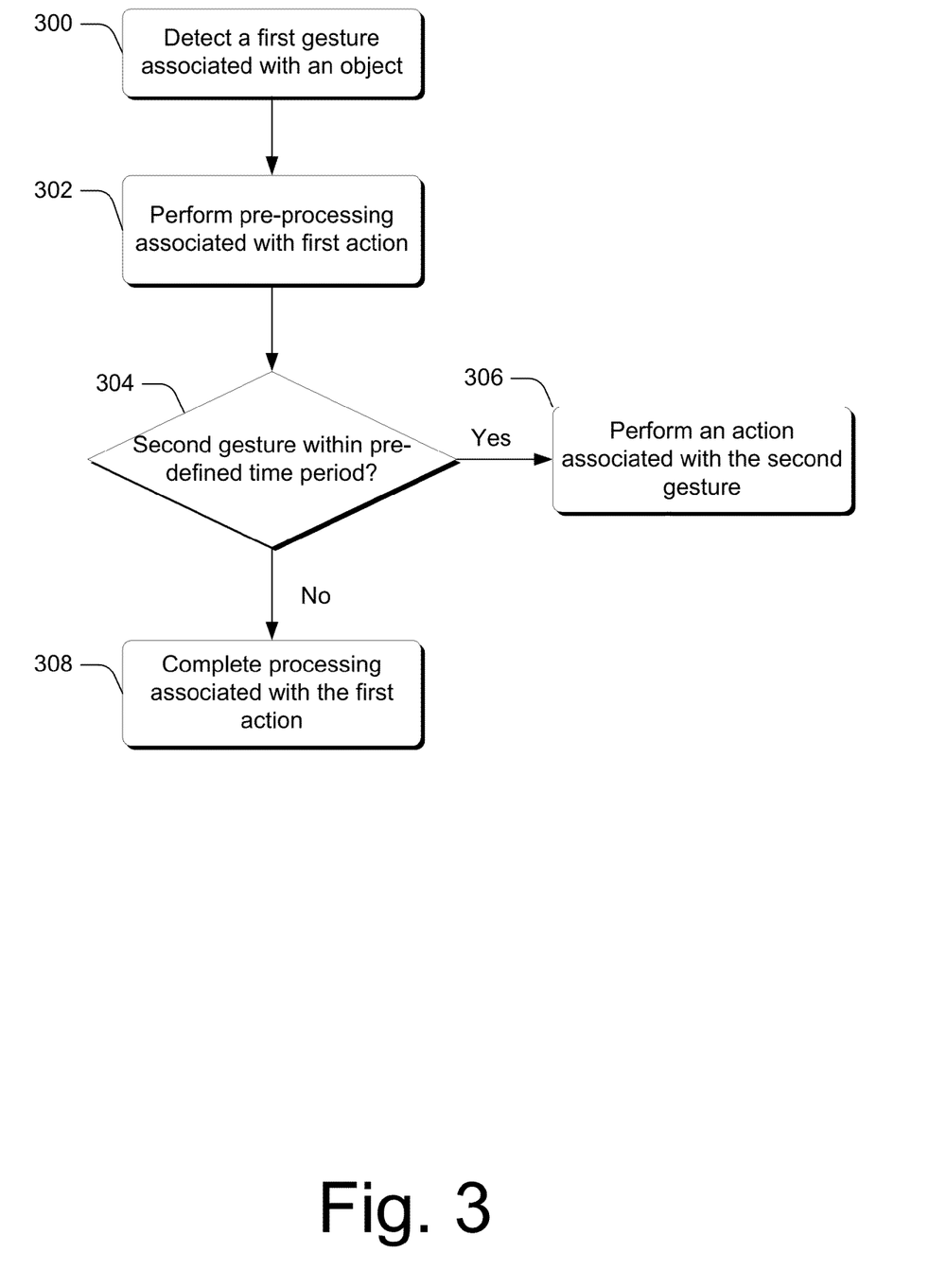
FIG. 3 is a flow diagram that describes steps of a method in accordance with one or more embodiments.

FIG. 3 is a flow diagram that describes steps in a method accordance with one or more embodiments. The method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. Examples of software that can perform the functionality about to be described are the input pointer delay module 103, zoom module 104, and the gesture module 105 described above.

Step 300 detects a first gesture associated with an object. The first gesture is associated with a first action that can be performed relative to the object. Any suitable type of gesture can be detected. By way of example and not limitation, the first gesture can comprise a touch gesture, a tap gesture, or any suitable other type of gesture as described above. In addition, any suitable type of first action can be associated with the first gesture. For example, in at least some embodiments, the first action comprises a navigation that can be performed to navigate from one resource, such as a webpage, to another resource, such as a different webpage. Responsive to detecting the first gesture, step 302 performs pre-processing associated with the first action. In one or more embodiments, pre-processing is performed in the background so as to be undetectable by the user. Any suitable type of pre-processing can be performed including, by way of example and not limitation, initiating downloading of one or more resources. For example, assume that the object comprises a hyperlink or some other type of navigable resource. The pre-processing, in this instance, can include downloading one or more resources associated with performing the navigation.

Step 304 ascertains whether a second gesture is detected within a pre-defined time period. Any suitable pre-defined time period can be utilized. In at least some embodiments, the pre-defined time period is equal to or less than about 300 ms. Further, any suitable type of second gesture can be utilized. By way of example and not limitation, the second gesture can comprise a touch gesture, a tap gesture, or any suitable other type of gesture as described above.

Responsive to detecting the second gesture associated with the object within a pre-defined time period, step 306 performs an action associated with the second gesture. In at least some embodiments, the action can be associated with the gesture that includes both the first and second gestures. Any suitable type of action can be associated with the second gesture. By way of example and not limitation, such actions can include performing a zoom operation in which the object is zoomed up. In this case, the pre-processing performed by step 302 can be discarded. Zooming can be performed in any suitable way, examples of which are described below.

Alternately, responsive to the second gesture not being performed within the pre-defined time period, step 308 completes processing associated with the first action. This step can be performed in any suitable way. By way of example and not limitation, completion of the processing can include performing a navigation associated with the object and the resource or resources for which downloading was initiated during pre-processing.

In at least some embodiments, as will become apparent below, in addition to performing the pre-processing as described above, responsive to detecting the first gesture, one or more styles that are defined for an element of which the object is a type can be applied. Any suitable type of styles can be applied including, by way of example and not limitation, styles that are defined by a CSS pseudo-class. For example, styles associated with the :hover and/or :active pseudo-classes can be applied. As will be appreciated by the skilled artisan, such styles can be used to change an element's display properties such as the size, shape, color of an element, or to change a display background, initiate a position change, provide an animation or transition, and the like. For example, if a hyperlink normally changes colors or is underlined when selected by virtue of a defined style, such style can be applied when the first gesture is detected at step 300.

Having described how background pre-processing can be performed in accordance with one or more embodiments, consider now how concurrent user feedback can be provided in accordance with one or more embodiments.

Concurrent User Feedback—Example

Figure 4:
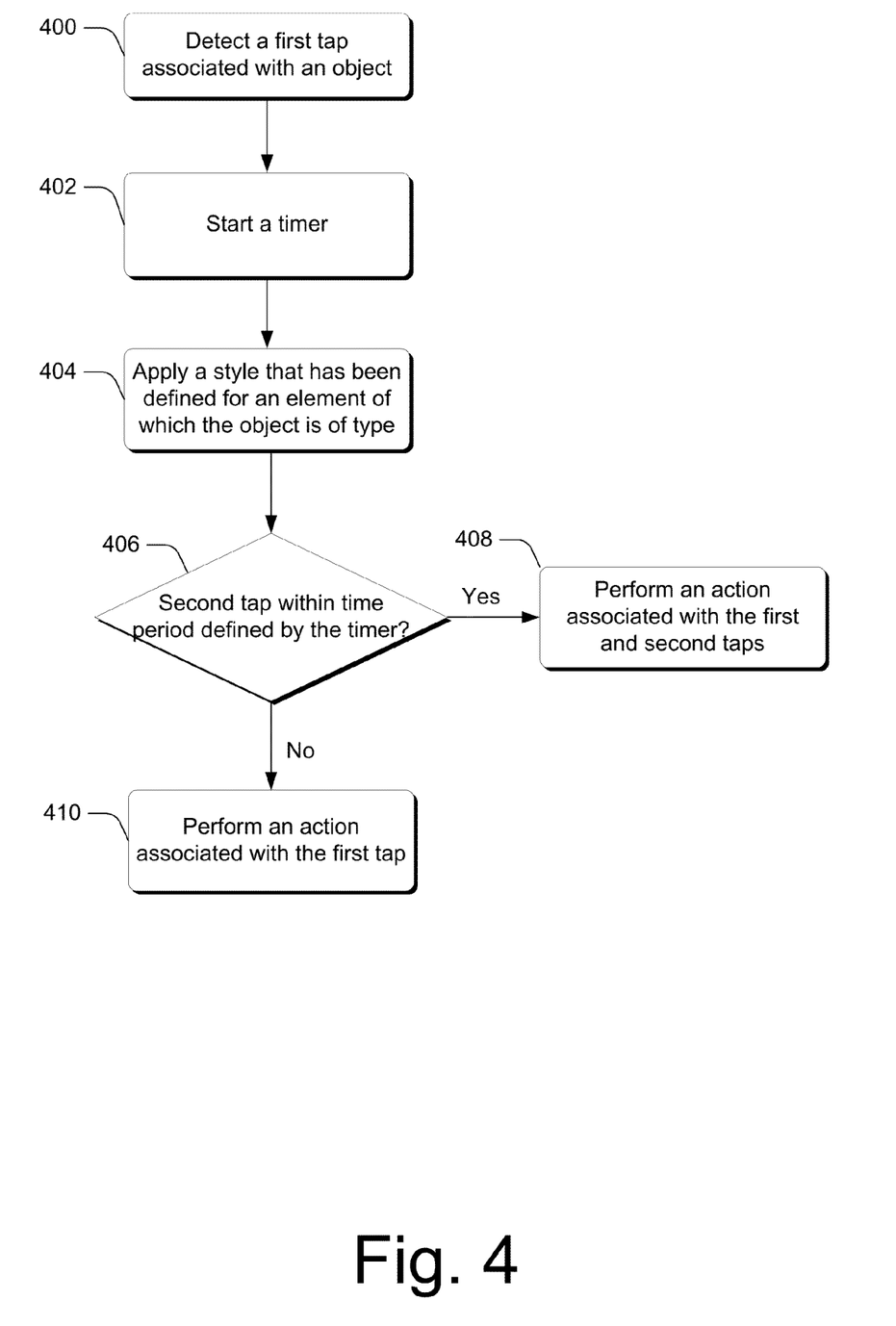
FIG. 4 is a flow diagram that describes steps of a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. Examples of software that can perform the functionality about to be described are the input pointer delay module 103, zoom module 104, and the gesture module 105 described above.

Step 400 detects a first tap associated with an object. Responsive to detecting the first tap, step 402 starts a timer. Responsive to detecting the first tap, step 404 applies a style that has been defined for an element of which the object is of type. Any suitable type of style or styles can be applied including, by way of example and not limitation, styles that are defined by a CSS pseudo-class. For example, styles associated with the :hover and/or :active pseudo-classes can be applied.

Step 406 ascertains whether a second tap is detected within a time period defined by the timer. Any suitable time period can be utilized. In at least some embodiments, the time period can be equal to or less than about 300 ms. Responsive to detecting the second tap within the time period defined by the timer, step 408 performs an action associated with a gesture comprising the first and second taps. Any suitable action can be performed. In at least some embodiments, the action associated with the gesture comprising the first and second taps comprises a zoom operation. Some examples of how zoom operations can be performed are described below.

Responsive to not detecting a second tap within the time period defined by the timer, step 410 performs an action associated with the first tap. Any suitable action can be performed. In at least some embodiments, the action associated with the first tap comprises performing a navigation.

In at least some embodiments, within the time period defined by the timer, pre-processing associated with performing the action associated with the first tap can be performed. Any suitable type of pre-processing can be performed. In at least some embodiments, pre-processing can include, by way of example and not limitation, initiating downloading of one or more resources. In this instance, the action associated with the first tap can comprise a navigation associated with the downloaded resource or resources.

Having considered embodiments that employ concurrent user feedback, consider now an approach that utilizes both background pre-processing and concurrent user feedback in accordance with one or more embodiments.

Background Pre-Processing and Concurrent User Feedback—Example

Figure 5:
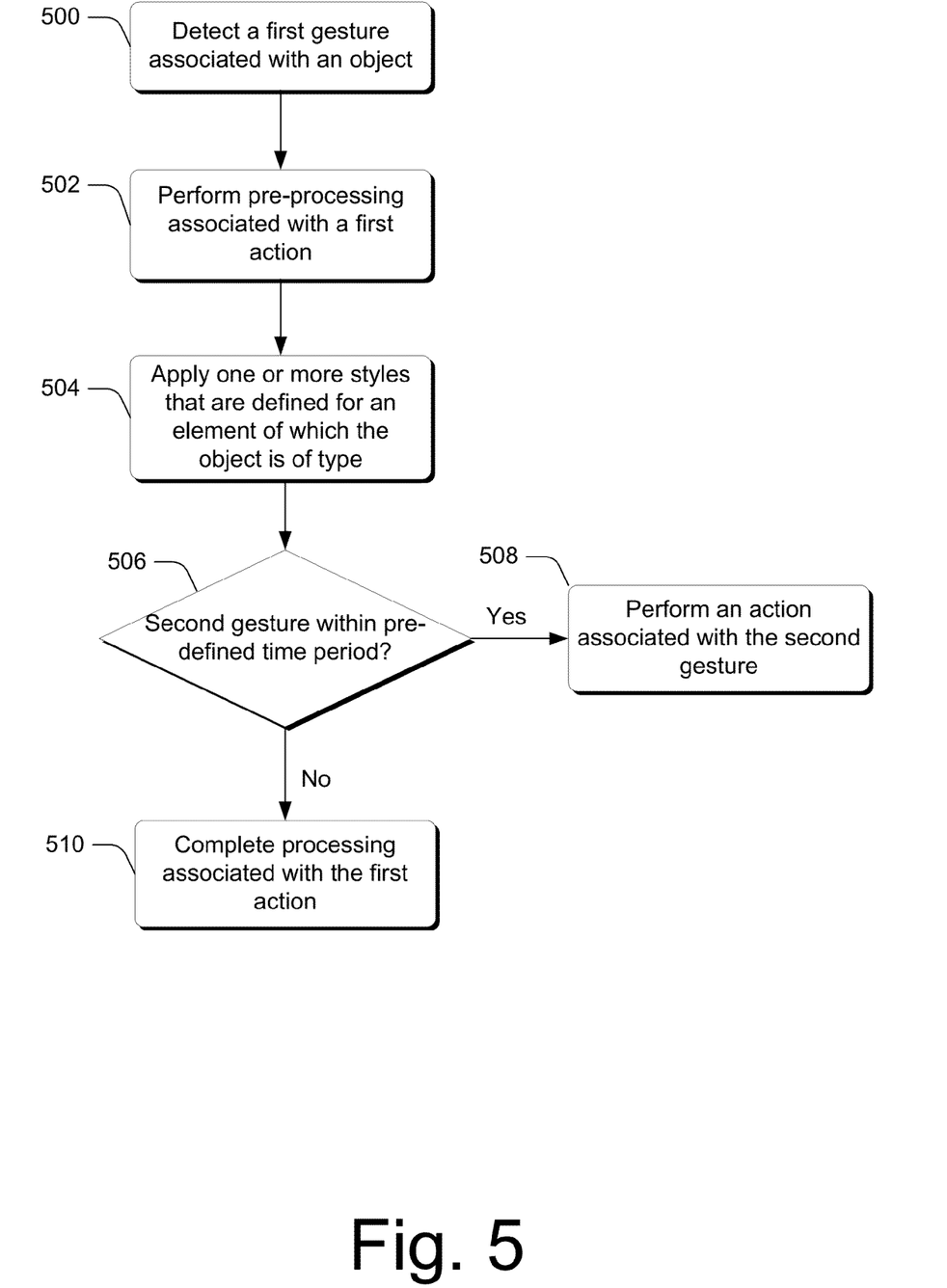
FIG. 5 is a flow diagram that describes steps of a method in accordance with one or more embodiments.

FIG. 5 is a flow diagram that describes steps in a method in accordance with one or more embodiments. The method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. Examples of software that can perform the functionality about to be described are the input pointer delay module 103, zoom module 104, and the gesture module 105 described above.

Step 500 detects a first gesture associated with an object. The first gesture is associated with a first action that can be performed relative to the object. Any suitable type of gesture can be detected. By way of example and not limitation, the first gesture can comprise a touch gesture, a tap gesture, or any suitable other type of gesture as described above. In addition, any suitable type of first action can be associated with the first gesture. For example, in at least some embodiments, the first action comprises a navigation that can be performed to navigate from one resource, such as a webpage, to another resource, such as a different webpage. Responsive to detecting the first gesture, step 502 performs pre-processing associated with the first action in the background. Any suitable type of pre-processing can be performed including, by way of example and not limitation, initiating downloading of one or more resources. For example, assume that the object comprises a hyperlink or some other type of navigable resource. The pre-processing, in this instance, can include downloading one or more resources associated with performing the navigation.

Step 504 applies one or more styles that are defined for an element of which the object is a type. Examples of how this can be done are provided above. Step 506 ascertains whether a second gesture is detected within a pre-defined time period. Responsive to detecting the second gesture within the pre-defined time period, step 508 performs an action associated with the second gesture. In at least some embodiments, the action can be associated with a gesture that includes both the first and second gestures. In at least some embodiments, the first and second gestures can comprise a tap gesture. Any suitable type of action can be associated with the second gesture. By way of example and not limitation, such action can include performing a zoom operation in which the object is zoomed up. Examples of how this can be done are described below. In this case, the pre-processing performed by step 502 can be discarded.

Alternately, responsive to the second gesture not being performed within the pre-defined time period, step 510 completes processing associated with the first action. This step can be performed in any suitable way. By way of example and not limitation, completion of the processing can include performing a navigation associated with the object and the resource or resources for which downloading was initiated during pre-processing.

Having considered some example methods, consider now an implementation example.

Implementation Example

In one or more embodiments, the functionality described above can be implemented by delaying input pointer events. One way to do this is as follows. When an input is received such as a tap from a gesture, a pinch gesture, a pen tap, a mouse click, input from a natural user interface (NUI) and the like, a timer is set to a predefined time such as, by way of example and not limitation, 300 ms. A double tap caching component is utilized and input messages are re-routed to the double tap caching component. In addition, a preliminary message is sent to a selection component to perform selection-related logic without delay. The functionality performed by the selection-related component can be performed, in the above examples, by the input pointer delay module 103. Selection-related logic can include selecting text that was tapped, un-selecting text that was previously tapped, launching a context menu because already-selected text has been tapped, and the like.

In one or more embodiments, pseudo-classes such as :active and :hover would already have been applied by normal input processing because a tap is composed of a touch-down and a touch-up, and :active and :hover are applied during touch-down, before a tap is recognized. This also means that the webpage would have seen some events leading up to the tap.

The double tap caching component examines the previously-sent message and performs the following logic. First, the component ascertains whether the input is caused by a touch with the primary contact (i.e., a touch with one finger). If not, then the input is processed as usual. This allows things such as mouse interactions to continue in an unimpeded manner.

If, on the other hand, the input is caused by a touch with the primary contact, the logic continues and ascertains whether such is a new contact. If the input is not a new contact, then a corresponding message is appended to an internal deferred messages queue and ignored for the time being. Any information that can only be gathered at the time a message is received is gathered and stored in this queue, e.g., whether the touch came from physical hardware or was simulated. If, on the other hand, the contact is a new contact the logic continues as described below.

The logic now ascertains whether the location of the new contact is close enough to a previously-detected tap to be considered a double tap. If not, this is treated the same as a timeout. When a timeout occurs, if the element that was originally tapped still exists, then every input message in the deferred messages queue is processed immediately, in order, thus completing a delayed tap. An exception is that these messages are hidden from the selection manager because actions associated with the selection manager have already been performed.

If the location of the new contact is close enough to the previously-detected tap to be considered a double tap, the logic ascertains whether the originally-tapped element still exists. If the originally-tapped element still exists, a "pointer cancel" event is sent through the document object model (DOM) and :active and :hover are removed to indicate to the webpage that saw the first half of the tap that no more of the tap will be forthcoming. Whether or not the element still exists, the logic continues as described below.

Next, any text on the page is unselected which effectively undoes the previous selection. At this point, a double tap zoom operation is performed and all messages in the deferred messages queue are discarded so that the webpage never sees them.

Having consider example embodiments in which input delay can occur, consider now a discussion of example zoom logic in accordance with one or more embodiments.

Example Zoom Logic

Figure 6:
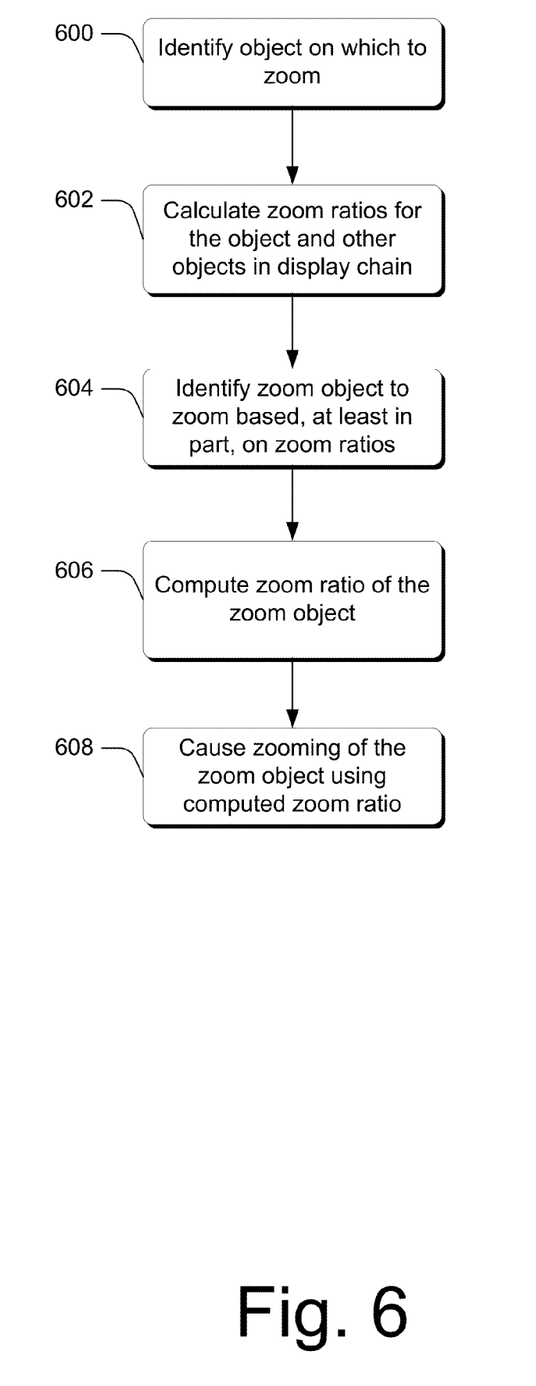
FIG. 6 is a flow diagram that describes steps of a method in accordance with one or more embodiments.

FIG. 6 is a flow diagram that describes steps in a method in accordance with one or more embodiments. The method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. Examples of software that can perform the functionality about to be described are the input pointer delay module 103, zoom module 104, and the gesture module 105 described above. The software that performs the method about to be described can be embodied by a web browser or a module or component other than a web browser.

Step 600 identifies an object on which to zoom. This step can be performed in any suitable way. For example, in at least some embodiments, an object can be identified by receiving a touch gesture associated with the object. Any suitable types gesture can be utilized including, by way of example and not limitation, a tap gesture, a double tap gesture such as that described above, a pinch gesture, a mouse click, a stylus selection, and the like. Alternately or additionally, an object can be identified via an input other than a touch gesture such as, by way of example and not limitation, a natural user interface (NUI) gesture.

Step 602 calculates zoom ratios for an identified object and at least one other object in a display chain associated with the identified object and other object(s). In one or more embodiments, a display chain can include a hierarchical relationship of objects that appear within other objects. For example, in a webpage, a child object such as an image, may have a parent object that includes text. The parent object, in turn, can have a parent object that might include several paragraphs such as that which would appear in a story. Accordingly, this step calculates zoom ratios for multiple objects that appear within a display chain.

Step 604 identifies a zoom object to zoom based, at least in part, on the zoom ratios calculated in step 602. In one or more embodiments, the zoom object can include the initially-identified object as well as another object or objects that appear in the display chain. By selecting a zoom object that includes multiple different objects in the display chain, the contextual surrounding of the initially-identified object is considered in the zoom operation that is to be performed. Step 606 computes a zoom ratio of the zoom object and step 608 causes zooming of the zoom object using the computed zoom ratio from step 606. This step can be performed by calling a suitably configured application program interface (API) and passing in the relevant information to use in zooming. In at least some embodiments, the zoom operation of step 608 is performed on less than all of the objects in the display chain. Further, as will become apparent below, a zoom operation that uses a category-based prioritization process can be used to select the objects that comprise the zoom object.

In this manner, not only is the initially-identified object zoomed, but at least other objects related to the initially-identified object are zoomed. As such, content that may be relevant to the initially-identified object are subject to the zoom operation. Accordingly, such relevant content, in addition to the initially-identified object, can be more easily consumed by a user.

But one way in which the above-described functionality can be implemented is described below in a section entitled "Zoom Logic-Implementation Example."

Figure 7:
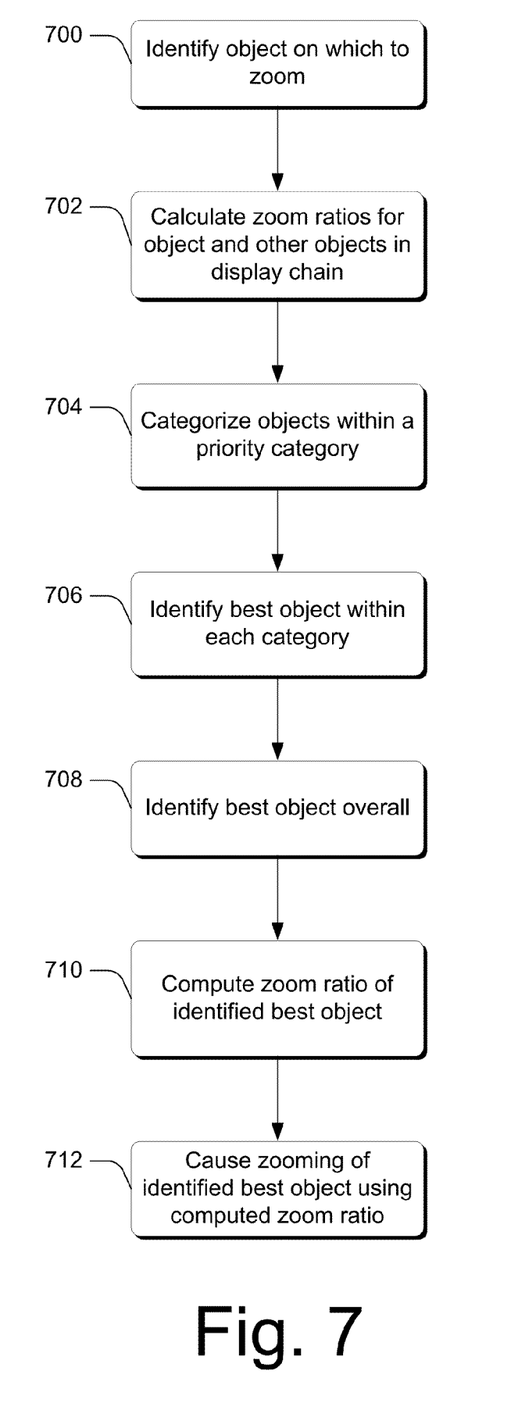
FIG. 7 is a flow diagram that describes steps of a method in accordance with one or more embodiments.

FIG. 7 is a flow diagram that describes steps in a method in accordance with one or more embodiments. The method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. Examples of software that can perform the functionality about to be described are the input pointer delay module 103, zoom module 104, and the gesture module 105 described above. The software that performs the method about to be described can be embodied by a web browser or a module or component other than a web browser.

Step 700 identifies an object on which to zoom. This step can be performed in any suitable way. For example, in at least some embodiments, an object can be identified by receiving a touch gesture associated with the object. Any suitable types gesture can be utilized including, by way of example and not limitation, a tap gesture, a double tap gesture such as that described above, a pinch gesture, a mouse click, a stylus selection, and the like. Alternately or additionally, an object can be identified via an input other than a touch gesture such as, by way of example and not limitation, a natural user interface (NUI) gesture.

Step 702 calculates zoom ratios for the identified object and other objects in a display chain associated with the identified object and the other objects. Examples of how this can be done are described above and below. Step 704 categorizes the objects within a respective priority category of a plurality of priority categories. Accordingly, the objects are ranked within one of the plurality of categories. In one or more embodiments, the categories can be defined by object width ratios and object height ratios. One example way in which this can be done is described below. For any priority category that has more than one object, step 706 identifies a best object within the priority category that has more than one object. Accordingly, in an event that more than one object is ranked within the same category, a best object within that category is selected. In one or more embodiments, the best object can comprise a plurality of objects that are less than the total number of objects in the display chain. An example of how this can be done is provided below.

Step 708 identifies a best object overall from among the priority categories. In one or more embodiments, this step can be performed by selecting the best object from a category with the highest priority. One example of how this can be done is provided below. Step 710 computes a zoom ratio of the identified best object. One example of how this can be done is provided below. Step 712 causes zooming of the identified best object using the computed zoom ratio from step 710. This step can be performed by calling a suitably configured application program interface (API) and passing in the relevant information to use in zooming.

Having considered example methods in accordance with one or more embodiments, consider now an implementation example that employs zoom logic in accordance with one or more embodiments.

Zoom Logic—Implementation Example

Once an input associated with a zoom operation is received, such as those described above as well as others, zoom logic can be employed which effectively identifies the element or object to focus on, calculates a zoom ratio that is to be used to conduct the zoom operation, and animates the identified element or object into view. Each of these aspects is discussed under its own sub-heading below.

Identify Object or Element to Focus on

In one or more embodiments, an element or object to focus on can be one of the following: the element or object relative to which the input was received, or one or more of its ancestors in an associated display chain, such as a display tree that has been built prior to rendering. In one or more embodiments, the element or object can include multiple other elements or objects, up to but not including the page on which the elements or objects appear. The element or object to focus on is the one that can desirably fill the associated rendering container, such as an associated application window, device screen and the like, while being maximally zoomed.

In one or more embodiments, parameters are established and utilized to ascertain how to conduct a particular zoom operation. In at least one embodiment, parameters associated with a zoom ratio are established such that the zoom ratio cannot be greater than 150% or smaller than 100%. In this particular example, a so-called aspirational ratio of 140% is utilized to guide the processing associated with zoom operation.

Given this, each element or object can be categorized into one of a plurality of priority categories. As but one example, consider FIG. 8 which illustrates a priority grid, generally at 800, that includes a plurality of priority categories designated P1-P9. Individual priority categories are defined based upon width ratios and height ratios as indicated. The categories are defined by what percent zoom would need to be applied in order to fill the rendering container, e.g., application window or device screen, for each axis. In this example, the size of the element or object itself (as indicated by the boxes in dark lines) is utilized to categorize the element or object within a particular category. Alternately, consideration can be given to take into account whether the element is occluded. For example, if a large element is contained in a small element with a scrollbar that allows the user to see the whole element, the effective element size would be the size of the small element with a scrollbar.

Figure 8:
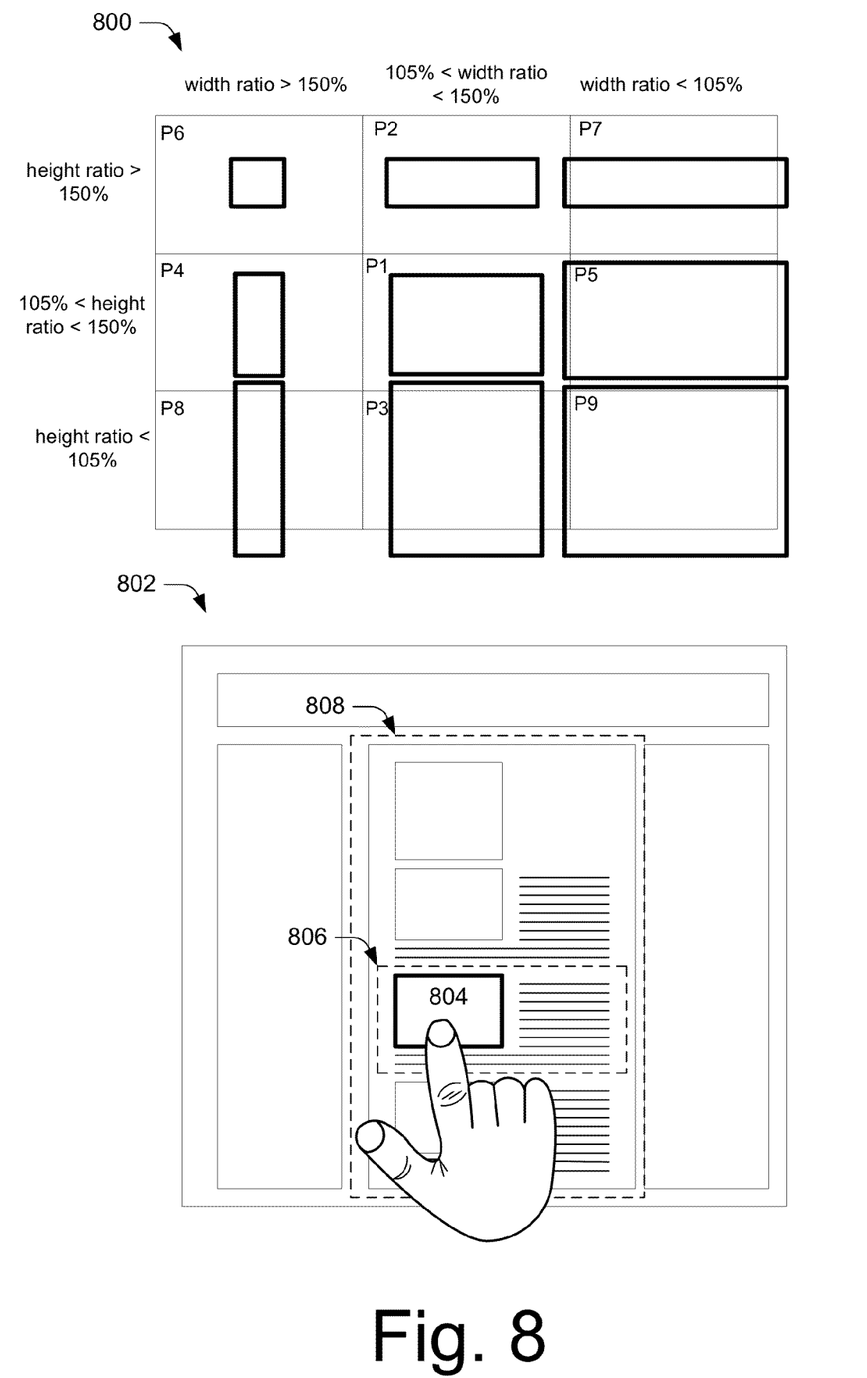
FIG. 8 is an illustration of an example grid in accordance with one or more embodiments.

In the illustrated and described example, when the page itself has a default zoom of 100%, in order to avoid favoring elements or objects that are close to the page shape/width, a percentage of 105% is used as the cutoff point between an element that is too wide and just fits.

In the priority grid, the highest priority category is P1 because an element can be zoomed around 140% to fill the rendering container to achieve the aspirational ratio. Lower priority categories, in order from high to low are: P2, P3, P4, P5, P6, P7, P8, and P9.

Calculate Zoom Ratios

For each element within the display chain (including the element that was selected), a calculation is performed to calculate the element's zoom ratio according to the following logic:

P1 element: ratio which ensures that most of the screen or rendering container is fully filled with the element, without any of it getting clipped. This is an area-based calculation, implicitly taking into account both the height and the width of the element, but collapsing them to a single zoom ratio value.

P2, P3, P8 elements: ratio that ensures that the element fills the window horizontally (as closely to the vertical window edges as possible).

P4, P5, P7 elements: ratio that ensures that the element fills the window vertically (as closely to the horizontal window edges as possible).

P6 element: automatically gets zoomed to an upper bound zoom, e.g., 150%.

P9 element: 140%

Note that in one or more embodiments, fixed elements are not treated as special cases. In other words, fixed elements should not be special with respect to zoom level (and should zoom like any other element/entire page). They should, however, be treated as special when it comes to positioning/animation, as described below.

Once all of the elements within the element's display chain are traversed (including the element that was selected), elements are stack-ranked within each priority category. For example, if there is more than one element in category P1 in the display chain, it is compared with all of the other elements in category P1. The best element within each priority category is the element with the zoom ratio (from the above element zoom ratio calculation) that is closest to 140%. Alternately, rather than finding the best element within each priority category, one can find the best element within the best priority category. For example, as soon as a P2 element is encountered, any P5 elements can be ignored.

Thus, as noted above, for any given element or object, a calculation is performed to ascertain how much it would take to zoom to the aspirational ratio (to generally fill the rendering container). For example, if horizontally one would need a 200% zoom, and vertically one would need a 200% zoom, then the element or object falls into the P6 category, meaning that it is too small. Thus, the priority categories essentially identify where elements or objects are too small (either horizontally, vertically, or different combinations) and define weightings for each. As noted above, category P1 is the highest priority because here, one can zoom around 140% and have it fill the screen or otherwise achieve the aspirational ratio. As the display chain is traversed and an element's or object's ancestors are considered, the progression leads to larger and larger boxes. The elements/objects or collection of elements/objects are categorized into the grid. For example, if a user clicks on a P6 element or object, a determination is made that the categorization of the element or object is not desirable because it is too small. Accordingly, the next adjacent ancestor in the display chain (i.e., the one that contains the P6 element) is selected and further analyzed to see if, for example, the P6 element or object is within a P2 element. In turn, analysis continues to ascertain whether the P2 element or object is within an element or object that falls within a more desirable catergory, e.g. a P1 element or object. When an element or object is too big (e.g. within a P9 category), a zoom operation is used that simply zooms on the touched or otherwise selected part of the element.

Next, the best element or object overall is selected. The best overall element or object is the best element from the category with the highest priority (where P1 is the highest possible and P9 is the lowest). For example, if the display chain (including the element that was selected) includes elements from categories P6, P1 and P5, the best element overall is the best element from category P1. Effectively, this category prioritization ensures the following prioritization of zoom impact:

1. The best element should fit horizontally after zooming.
2. The best element should fit vertically after zooming.
3. The best element should not be cut or clipped horizontally after zooming.
4. The best element should not be cut or clipped vertically after zooming.
5. The chosen zoom factor should be as close to 140% as possible, within the given zoom range (e.g., 100%-150%).

Next, the exact zoom ratio for the best overall element is computed. The exact page zoom ratio depends on which category the best element overall belongs to. For example, in at least some embodiments, the following approach can be used. If the element zoom ratio for the best element overall is greater than 150%, then use 150%. If the element zoom ratio for the best element overall is smaller than 150% and greater than 105%, then use the element zoom ratio. If the element zoom ratio for the best element overall is smaller than 105%, do not zoom. For example, if the best element overall is a P1 element that can zoom 135% to fill the screen horizontally and vertically 145%, it will be zoomed 135% so that it does not get cut off vertically.

Animate Identified Object or Element into View

Having performed the above-described processing, a suitably configured application program interface (API) can be used to animate the best element overall into a destination rectangle as follows. The scale ratio is the page zoom ratio calculated above, and the position is calculated according to the following logic, based on the above priority category that the best element overall belongs to:

P1: Center the element both horizontally and vertically
P2: Center vertically on the element
P3: Center vertically on the point tapped or selected
P4: Center vertically on the element
P5: Center horizontally on the point tapped or selected
P6: Center (both horizontally and vertically) the element
P7: Center horizontally on the point tapped or selected
P8: Center vertically on the point tapped or selected
P9: Zoom around the point tapped or selected As an example, consider a web page 802 in which a plurality of elements or objects are displayed, as represented by the boxes which can be images and the lines which can be text. Assume in this example that a user has selected element or object 804 for a zoom operation. Using the above-described methodology, the zoom logic would process element or object 804, its parent object 806 and the parent object 808 of object 806. Even though the user selected object 804 for zooming, the result of the processing described above could result in objects 804 and 806 or objects 804, 806, and 808 being zoomed on. In this way, contextually relevant material around the user's selection would be zoomed for the user's consumption.

In this implementation example, there is a special case that pertains to fixed elements. Fixed elements, because of their fixed nature, can be zoomed but in at least some instances, cannot be fully positioned properly. Consider the notion of a visual view port and a layout view port when zoomed in. The visual view port is smaller than and contained within the layout view port and fixed elements are always fixed to the layout viewport. In these instances, the visual viewport can be moved to attempt to center a fixed element. Thus, if a fixed element is on the edge of a layout viewport, it cannot be centered along that axis. Thus, when fixed elements are encountered, an attempt will be made to center it, with no guarantees.

Having described an example implementation, consider now a discussion of an example device that can be utilized to implement the embodiments described above.

Example Device

Figure 9:
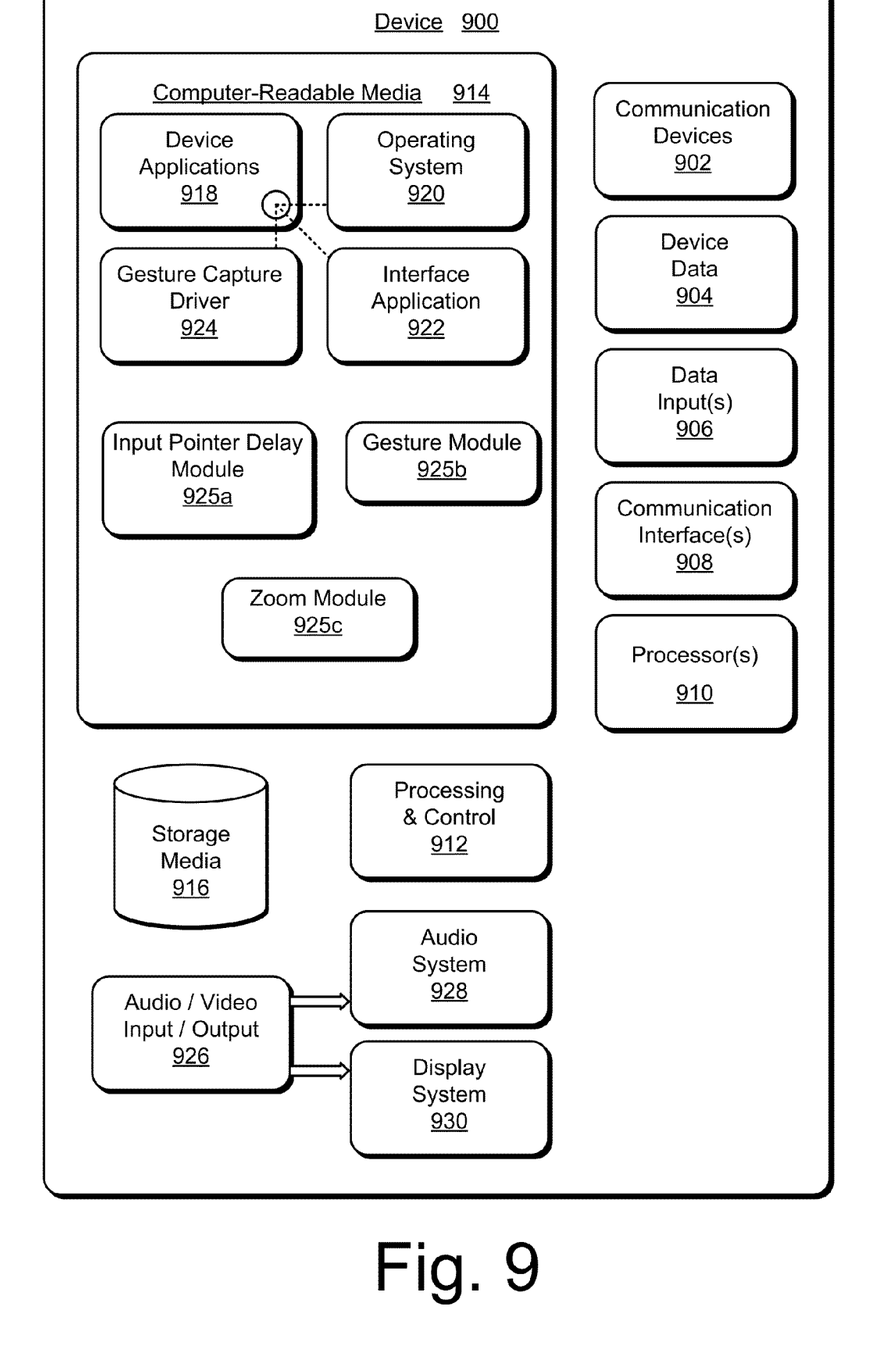
FIG. 9 illustrates an example computing device that can be utilized to implement various embodiments described herein.

FIG. 9 illustrates various components of an example device 900 that can be implemented as any type of portable and/or computer device as described with reference to FIGS. 1 and 2 to implement embodiments of the animation library described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable or readable instructions to control the operation of device 900 and to implement the embodiments described above. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 918 also include any system components or modules to implement embodiments of the techniques described herein. In this example, the device applications 918 include an interface application 922 and a gesture-capture driver 924 that are shown as software modules and/or computer applications. The gesture-capture driver 924 is representative of software that is used to provide an interface with a device configured to capture a gesture, such as a touchscreen, track pad, camera, and so on. Alternatively or in addition, the interface application 922 and the gesture-capture driver 924 can be implemented as hardware, software, firmware, or any combination thereof. In addition, computer readable media 914 can include an input pointer delay module 925a, a gesture module 925b, and a zoom module 925c that functions as described above.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

Conclusion

Various embodiments enable repetitive gestures, such as multiple serial gestures, to be implemented efficiently so as to enhance the user experience. Other embodiments provide various approaches to zoom operations that consider a particular element's contextual surroundings in making a zoom decision that is designed to enhance the user experience and provide efficiently-zoomed content given a device's or rendering container's form factor.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
   identifying an object on which to zoom;
   calculating zoom ratios for an identified object and at least one other object in a display chain associated with the identified object and said at least one other object;
   ranking the identified object and the at least one other object in the display chain within a plurality of categories according to the zoom ratios;
   identifying a zoom object based, at least in part, on said ranking, said zoom object including said identified object and said at least one other object in the display chain;
   computing a zoom ratio of the zoom object; and
   causing zooming of the zoom object using the zoom object's zoom ratio.

2. The method of claim 1, wherein said identifying comprises identifying the object on which to zoom via touch gesture.

3. The method of claim 1, wherein said identifying comprises identifying the object on which to zoom via an input other than a touch gesture.

4. The method of claim 1, wherein said identifying comprises identifying the object on which to zoom via a double tap gesture.

5. The method of claim 1, further comprising after calculating zoom ratios for an identified object and at least one other object, categorizing objects within the plurality of categories, wherein if there is more than one object within a category, ranking the objects within the category.

6. The method of claim 1, further comprising:
   after calculating zoom ratios for an identified object and at least one other object, categorizing objects within one of the plurality of categories, and wherein if there is more than one object within a category, ranking the objects within the category; and
   wherein if more than one object is ranked within a same category, identifying a zoom object comprises selecting a best object based on the ranking of the objects within the same category.

7. The method of claim 1, further comprising after calculating zoom ratios for an identified object and at least one other object, categorizing objects within one of the plurality of categories, wherein if there is more than one object within a category, ranking the objects within the category wherein said identifying a zoom object comprises selecting a best object based on the ranking of the objects from a category with a highest priority.

8. The method as recited in claim 1, wherein the plurality of categories is defined for different object sizes.

9. One or more computer readable storage device embodying computer readable instructions which, when executed, implement a method comprising:
   identifying an object on which to zoom;
   calculating zoom ratios for the identified object and other objects in a display chain associated with the identified object and the other objects;
   categorizing the identified object and the other objects within a respective priority category of a plurality of categories at least some of which are defined by object width ratios and object height ratios;
   for any priority category that has more than one object, identifying a best object based on a ranking of the more than one object within the priority category;

identifying a best object overall from among the priority categories;

computing a zoom ratio of the best object; and causing zooming of the identified best object using the computed zoom ratio.

10. The one or more computer readable storage device of claim 9, wherein the best object comprises the identified object and at least one other object.

11. The one or more computer readable storage device of claim 9, wherein the best object comprises a plurality of objects that are less than the total number of objects in the display chain.

12. The one or more computer readable storage device of claim 9, wherein said computer-readable instructions are embodied by a web browser.

13. The one or more computer readable storage device of claim 9, wherein said computer-readable instructions are embodied in a software module other than a web browser.

14. The one or more computer readable storage device of claim 9, wherein said identifying comprises identifying the object on which to zoom via touch gesture.

15. The one or more computer readable storage device of claim 9, wherein said identifying comprises identifying the object on which to zoom via an input other than a touch gesture.

16. The one or more computer readable storage device of claim 9, wherein said identifying comprises identifying the object on which to zoom via a double tap gesture.

17. A system comprising:

memory; and computer readable instructions stored on the memory that, when executed by a device, implement a zoom module to perform operations including:

calculating zoom ratios for an identified object and at least one other object in a display chain associated with the identified object and said at least one other object;

identifying a zoom object that includes multiple different objects in the display chain based, at least in part, on said zoom ratios, said zoom object selected to include said identified object and at least one other object in the display chain using category-based prioritization to categorize the identified object and the other objects within a respective priority category of a plurality of categories using an area-based computation; and causing zooming of the zoom object using a zoom ratio computed for the zoom object.

18. The system of claim 17, wherein the categories are defined according to object height and width ratios.

19. The system of claim 18, wherein the multiple different objects included in the zoom comprise less than a total number of objects in the display chain.

* * * * *